No. 790,609.                                      Patented May 23, 1905.

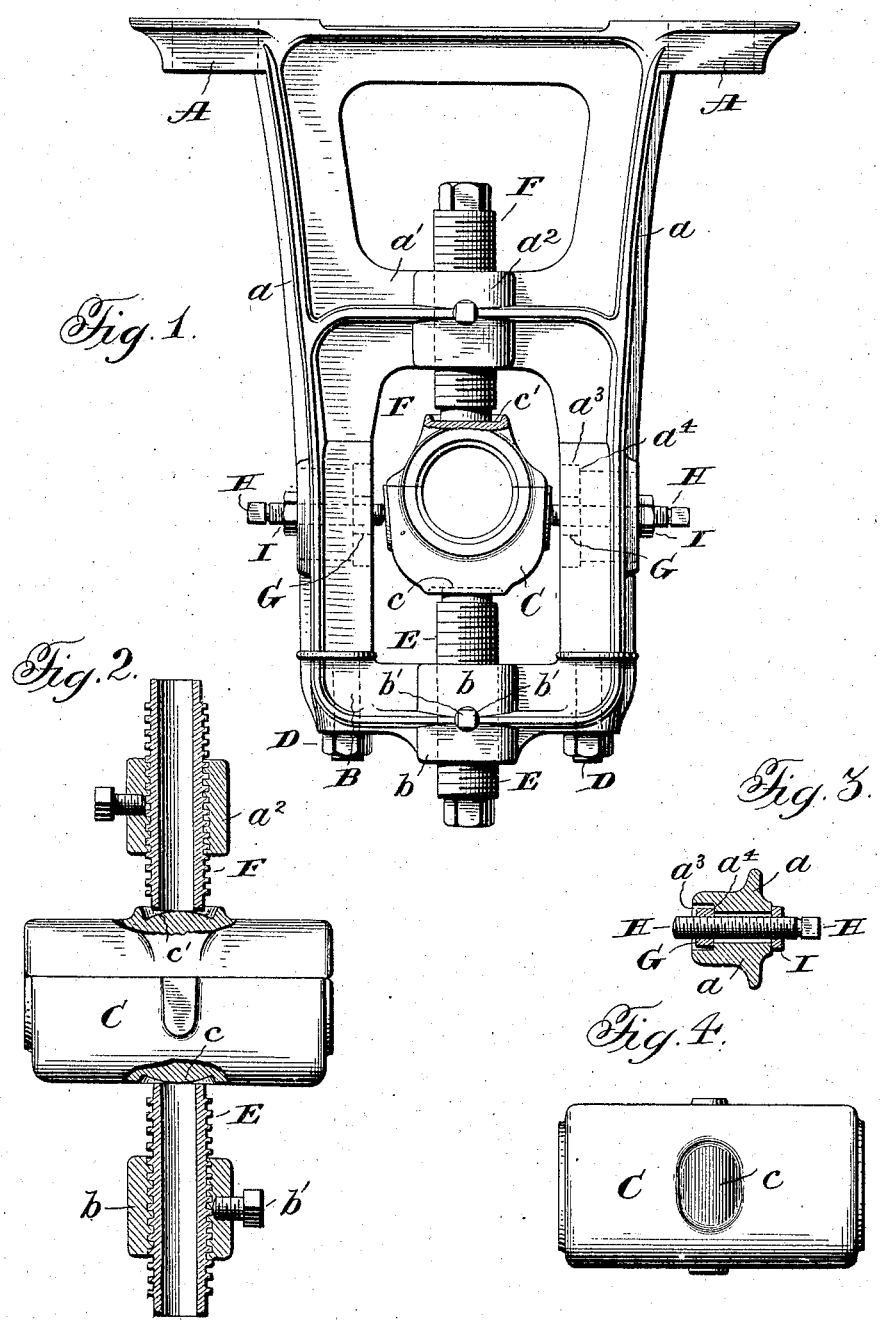

UNITED STATES PATENT OFFICE.

CHARLES O. WOOD, OF CHAMBERSBURG, PENNSYLVANIA.

SHAFT-HANGER.

SPECIFICATION forming part of Letters Patent No. 790,609, dated May 23, 1905.

Application filed June 18, 1903. Serial No. 162,076.

*To all whom it may concern:*

Be it known that I, CHARLES O. WOOD, of Chambersburg, in the county of Franklin, and in the State of Pennsylvania, have invented a certain new and useful Improvement in Shaft-Hangers; and I do hereby declare that the following is a full, clear, and exact description thereof, reference being had to the accompanying drawings, in which—

Figure 1 is a side elevation of a shaft-hanger embodying my invention. Fig. 2 is a vertical cross-section of the lower portion of the same. Fig. 3 is a horizontal cross-section of one of the arms of the frame, and Fig. 4 is a bottom view of the bearing-box.

The object of my invention has been to provide a shaft-hanger which shall have, among others, the qualities of being easily adjustable, to accommodate variations in the relative positions of the shafting and hanger, and which shall be simple and cheap; and to such ends my invention consists in the shaft-hanger hereinafter specified.

In carrying my invention into practice I provide a base A, such base being adapted to be fastened to a portion of the building, such as the joists, and for such purpose having slots elongated in the direction of the length of the base, so that bolts can be passed through such slots and secured to the rafters, the slots permitting the hanger to be shifted on the rafter without changing the position of the bolts. From the base descend arms $a$, which are connected by a cross-arm $a'$ at a point above their lower ends. A cap B is secured by bolts D to the free ends of the arms $a$, and the bearing-box C is supported in the space inclosed by the arms A and $a'$ and the cap B. The cap B has formed in it a vertical socket $b$, in which is an internal screw-thread. A preferably hollow screw or plunger E is mounted in the socket $b$ and supports the lower side of the bearing-box upon its upper end. The bolt E bears against a surface $c$ upon the under side of the bearing-box, which surface is countersunk or is surrounded with a rib to prevent the escape of the box from engagement with the ends of the bolt E, and which surface is curved transversely to the end of the box, so that the box can rock upon the end of the screw or plunger E with the shaft to accommodate itself to the latter. By making the screw E hollow it can be made of the necessary diameter to give it strength with the use of a comparatively small amount of metal. For the purpose of turning the screw E its lower end is made polygonal in cross-section, so that it may be engaged by a wrench. A set-screw $b'$ is threaded into the wall of the socket $b$ to fasten the screw E in the desired position. The arm $a'$ is provided with a socket $a^2$, which is similar to and preferably in line with the socket $b$, and a screw or plunger F, similar to the screw or plunger E, is mounted, in the socket $a^2$ and engages a surface $c'$ on the upper side of the bearing-box, which surface is similar to the surface $c$, before mentioned. The surfaces $c$ and $c'$ are struck from a common center, so that, in effect, they form, with the screws or plungers E and F, a ball-and-socket joint. The screws or plungers E and F, having a broad bearing on the bearing-box, support themselves, so to speak, on such box, so that there is little or no tendency for them to tilt laterally or get out of line with each other, as is the case with slender or round-pointed screws, and they thus form a very rigid support for the box.

In practice I find a most rigid hanger to result from my construction.

In order to provide for the lateral adjustment of the bearing-box relative to the hanger, the arms $a$ are provided with vertically-elongated slots $a^3$, which slots are approximately on a level with the bearing-box. The said slots are larger at their inner ends than at their outer ends to form a seat or shoulder $a^4$, that is adapted to support a nut G, through which is threaded a bolt H, that bears upon the side of the bearing-box. A nut-lock I is preferably provided upon the screw H to secure the bolt in any desired position.

The mode of operating my bearing-box will be apparent from the foregoing description.

It will be seen that the bearing-box, while strongly and firmly supported, can rock vertically longitudinally of the shafting owing to the curvature of the surfaces $c$ and $c'$, that it can rock horizontally longitudinally of the shaft, and that it can be bodily adjusted either up or down or laterally, so that it is capable of accommodating itself to any position of the shaft. It will be seen that lateral adjustment of the bearing-box can be effected without disturbing the vertical screws or plungers.

Having thus described my invention, what I claim is—

1. In a shaft-hanger, the combination of an open frame, upper and lower vertical screws threaded in said frame, a bearing-box supported between said screws and having on its upper and lower sides cylindrical surfaces whose axes are transverse to the axis of the bearing, said surfaces being engaged by said screws and being surrounded by flanges, said engaging ends of said screws being flat and of sufficient width to prevent rotation of said bearing-box on the shaft, and horizontal screws in the frame whose ends engage the sides of the box.

2. In a shaft-hanger, the combination of an open frame, upper and lower vertical screws threaded in said frame, a bearing-box supported between said screws and having on its upper and lower sides cylindrical surfaces whose axes are transverse to the axis of the bearing, said surfaces being engaged by said screws and being surrounded by flanges, said engaging ends of said screws being flat and of sufficient width to prevent rotation of said bearing-box on the shaft, and horizontal screws in the frame, whose ends engage the sides of the box, said horizontal screws being adjustably mounted in vertical slots in the frame.

In testimony that I claim the foregoing I have hereunto set my hand.

CHARLES O. WOOD.

Witnesses:
W. H. FISHER,
G. HERBERT WOOD.